Feb. 10, 1942.    W. R. FREEMAN    2,272,320
BRAKE CONTROL MECHANISM
Filed Dec. 28, 1939    3 Sheets-Sheet 1

INVENTOR
W. R. FREEMAN
BY
ATTORNEY

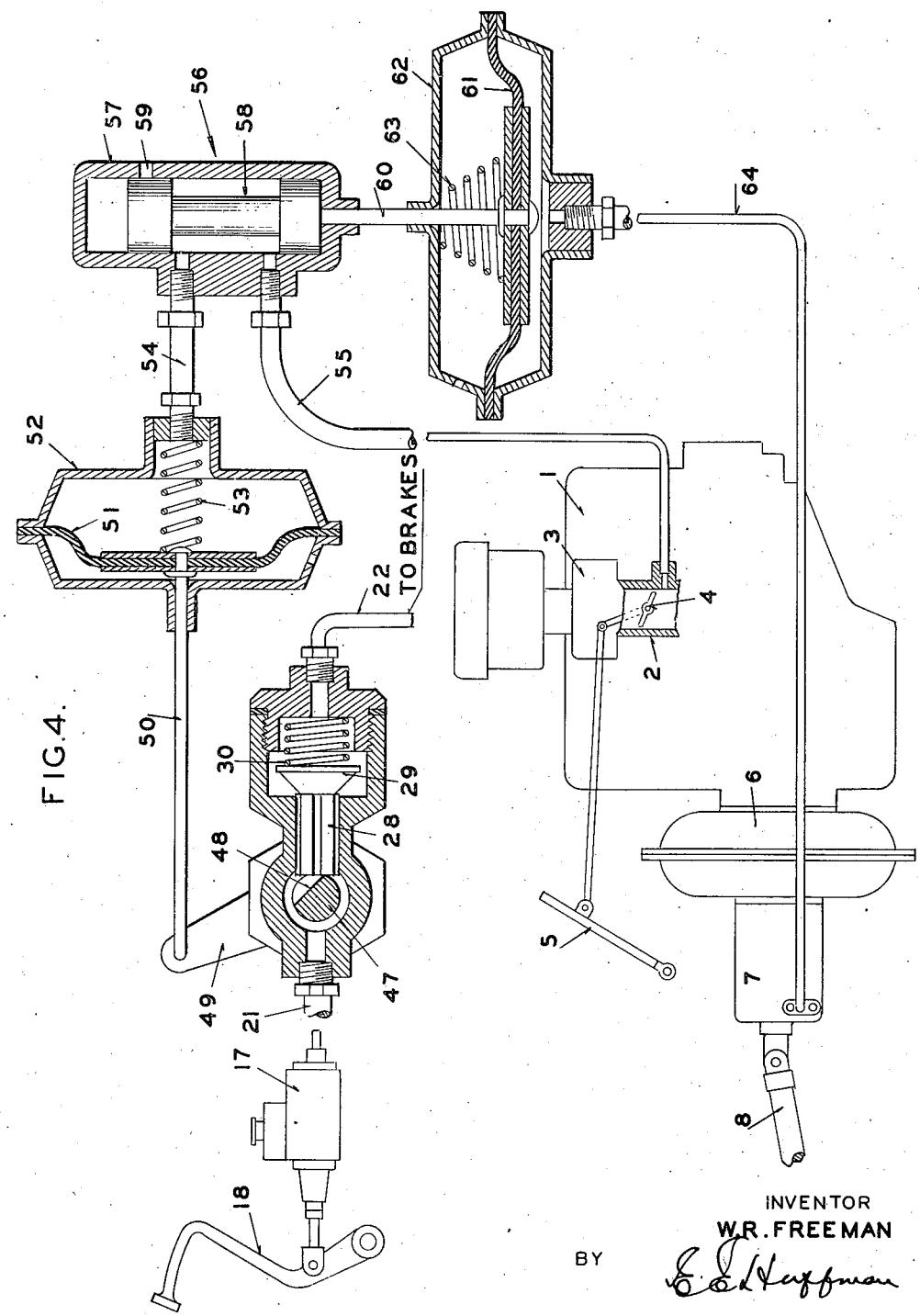

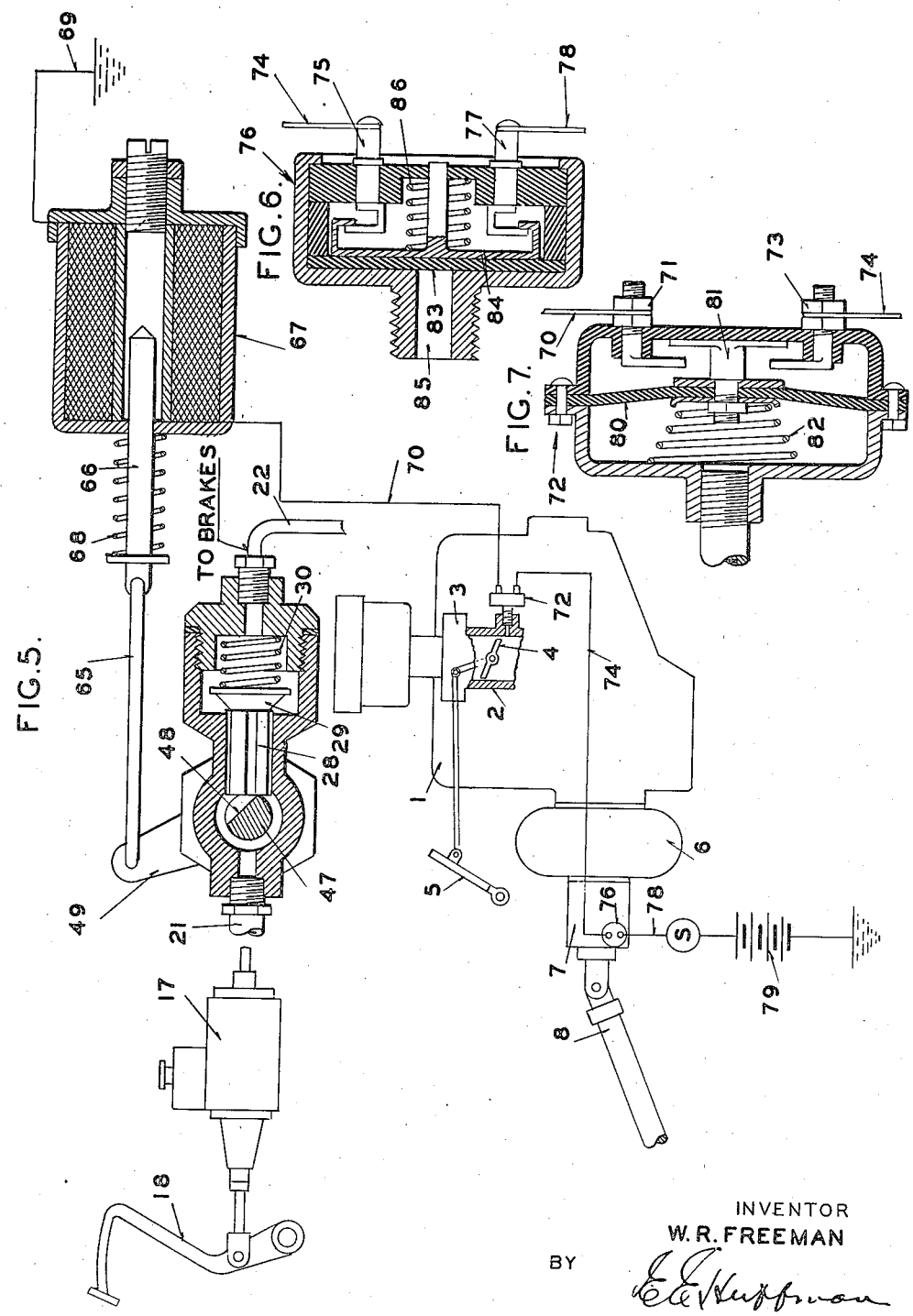

Patented Feb. 10, 1942

2,272,320

UNITED STATES PATENT OFFICE 2,272,320

BRAKE CONTROL MECHANISM

Walter R. Freeman, University City, Mo., assignor to Wagner Electric Corporation, St. Louis, Mo., a corporation of Delaware Application December 28, 1939, Serial No. 311,230

14 Claims. (Cl. 192—3)

My invention relates to brakes and more particularly to control mechanism therefor which will permit the brakes to be held applied under certain conditions.

One of the objects of my invention is to provide improved automatically operable means for holding the brakes applied when a vehicle has been brought to a stop.

Another object of my invention is to provide control means for holding the brakes applied which will cause the holding means to be automatically operative when the vehicle is stopped and be inoperative by fluid pressure created by rotation of a member which is employed to transmit torque to the wheels when the vehicle is moving and also inoperative when the engine of the vehicle is accelerated prior to the time of starting the vehicle.

Still another object of my invention is to provide a brake holding control means which can be used on a motor vehicle having an automatic change speed gearing of the type which has no disconnecting clutch and in which fluid under pressure is employed to perform the speed ratio changing.

Figure 1:
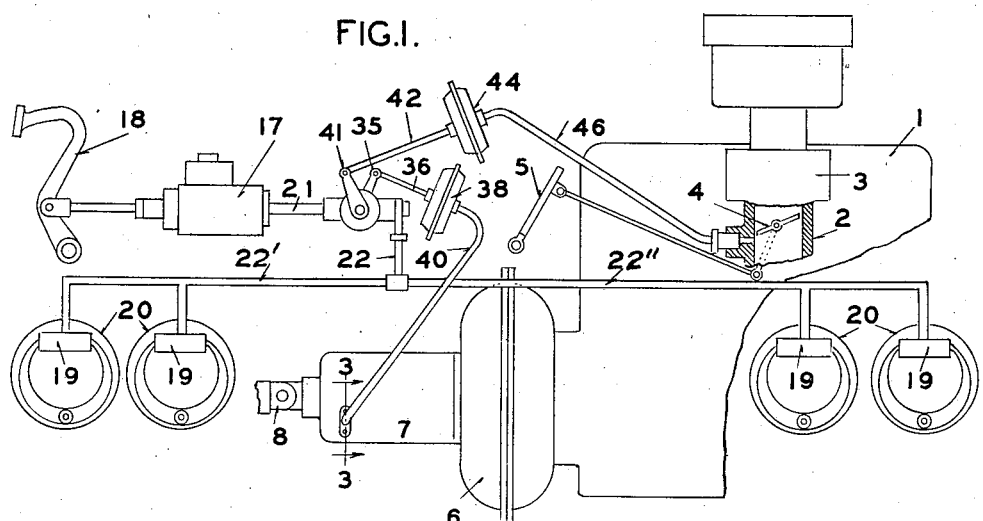
Figure 2:
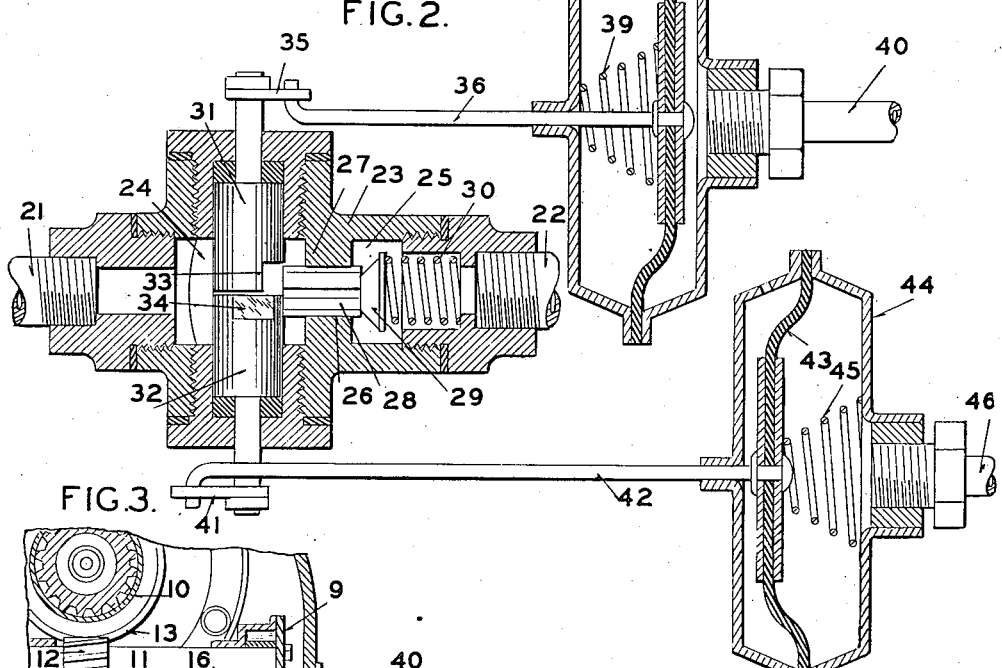
Figure 3:
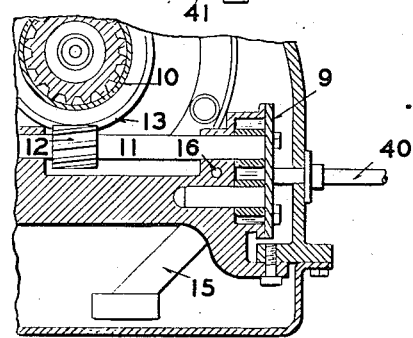

Other objects of my invention will become apparent from the following description taken in connection with the accompanying drawings in which Figure 1 is a schematic view of an engine, change speed gearing and a braking system having associated therewith means for holding the brakes applied and control means therefor; Figure 2 is a sectional view showing the brake holding means and the control fluid motors; Figure 3 is a sectional view taken on the line 3—3 of Figure 1 showing the fluid pressure pump of the change speed gearing; Figure 4 is a schematic view, parts being shown in section, of another control arrangement for a brake holding means; Figure 5 is a schematic view, parts being in section, of still another control arrangement for a brake holding means; Figure 6 is a sectional view of the pressure-controlled switch; and Figure 7 is a sectional view of the suction-controlled switch.

Referring to Figures 1, 2 and 3, numeral 1 indicates an internal combustion engine which is provided with the usual intake manifold 2 whereby fuel is supplied thereto from a carburetor 3, the amount of which can be varied by a throttle valve 4 controlled by the acceleration pedal 5. The crank-shaft of the engine is connected to the wheels (not shown) of the vehicle by a fluid coupling 6 of the Foettinger type and an automatic change speed gearing 7 and a propeller shaft 8. The fluid coupling and the gearing together form what is known as a "Hydromatic drive" and do not require the use of a disconnecting clutch and the usual clutch pedal as is necessary with manually shiftable change speed gearing. The gearing is of the planetary type and is controlled by fluid pressure developed by two pumps, one of which is driven constantly by the engine and the other by the driven shaft of the gearing which is connected to the propeller shaft. The latter mentioned pump I propose to employ as a part of my invention since it is already on the vehicle. However, a separate pump driven from the propeller shaft or any other element which is rotated only when the vehicle is moving can be employed if the vehicle is not equipped with the particular automatic change speed transmission shown. As shown in Figure 3, the pump 9 driven by the driven shaft 10 of the change speed gearing is of the gear type and is connected to the driven shaft by a shaft 11 and gears 12 and 13. The pump draws liquid such as oil from the bottom of the casing 14 through a pipe 15 and forces the liquid under pressure through the outlet 16 and suitable conduits to the elements (not shown) controlling the ratio changing of the gearing.

The braking system with which I have associated my brake holding means and control therefor is of the well-known hydraulic type and comprises a master cylinder device 17 operated by a pedal 18 to place liquid under pressure to operate the fluid motors 19 of the brake assemblies 20. Conduits 21 and 22 and branch conduits 22' and 22" place the fluid motors in communication with the master cylinder.

The valve mechanism for holding the brakes applied after they have been applied by the master cylinder device is interposed between conduits 21 and 22 and comprises a casing 23 provided with compartments 24 and 25 communicating with each other by a passage 26 in partition wall 27. The compartment 24 is connected to conduit 21 leading from the master cylinder and the compartment 25 is connected to conduit 22 leading to the fluid motors of the brakes. The passage 26 receives a fluted valve stem 28 carrying a valve element 29 for cooperating with the wall to close the passage and prevent flow of fluid from the fluid motors of the brakes but not in the opposite direction. A spring 30 biases the valve element toward a closed position.

Within the compartment 24 are journaled two rotatable members 31 and 32 having portions extending out of the casing on opposite sides. The inner ends of members 31 and 32 are provided, respectively, with flat surfaces 33 and 34 for controlling the valve element 29. When the members are so positioned that both flat surfaces are toward the valve stem, the valve element will be seated by its spring. When either member is rotated so that its flat surface is away from the valve stem then the valve element will be positively held unseated and liquid can flow in either direction through the passage 26.

The outer end of the rotatable member 31 carries an arm 35 which is connected by a rod 36 to the movable diaphragm 37 of a fluid motor 38. The diaphragm is normally biased to its inoperative position as shown by a spring 39 and when in this position the rotatable member 31 is in such a position that its flat surface 33 is presented toward the valve stem. The fluid motor is connected by a conduit 40 to the pressure side of pump 9 of the change speed transmission already referred to. It is thus seen that when the vehicle is moving and the pump is operating fluid pressure will be effective on the diaphragm 37 and causes the rotatable member 31 to be so positioned that the valve element 29 will be held open notwithstanding the position of the companion rotatable member 32.

The outer end of the rotatable member 32 carries an arm 41 which is connected by a rod 42 to the diaphragm 43 of a suction motor 44. A spring 45 biases the diaphragm to its inoperative position as shown wherein the rotatable member 32 will be held in such a position that the valve element 29 will be held open. The suction motor is connected by a conduit 46 to the manifold 2 of the engine at a point just below the throttle valve. Thus when the valve is closed in engine idling position the suction of the engine will be effective on the diaphragm 43 to thereby cause rotation of the rotatable member 32 to a position where the flat surface will allow the valve element to close if permitted to do so by the position of the companion rotatable member 31. When the throttle valve is open to accelerate the engine, as in starting the vehicle, the suction action will be so decreased that the spring 45 can place the diaphragm in the position shown in Figure 2.

Referring to the operation, when the vehicle is stopped and the engine is idling, suction will be effective on diaphragm 43 of the suction motor, thus causing the rotatable member to be positioned so that its flat surface will be toward the valve stem. No pressure will be produced by pump 9 since the driven shaft of the transmission is stationary. The fluid motor 38 will thus not be operated and the rotatable member 31 will be in the position shown in Figure 2. The valve element 29 will thus be seated by its spring. If the brakes have been applied, they will be held applied. If they have not been applied, such can be accomplished by operating the master cylinder device since the valve element will permit fluid under pressure to flow from the master cylinder to the brake fluid motors. With the brakes applied, the brake pedal can be released and the foot of the operator relieved of work or free to be employed for other purposes. The applied brakes hold the vehicle from rolling in either direction if it is on an inclined roadway.

When it is desired to start the vehicle moving the engine is accelerated. This will decrease the suction effect on the diaphragm of the suction motor 44 and the spring 45 will now be effective to move the rotatable member 32 to the position shown in Figure 2 to thereby unseat the valve element 29 and release the trapped fluid pressure effective in the fluid motors and permit the vehicle to freely move forward. As soon as the vehicle begins to move, pump 9 will develop pressure which will be effective to operate the fluid motor 38 and so position the rotatable member 31 as to hold the valve element unseated. As long as the vehicle remains in motion the holding valve will be inoperative and the brakes can be applied and released at will by proper movement of the brake pedal in the same manner as if the holding valve were not embodied in the braking system. The closing of the throttle valve will have no effect on the operation of the valve element. Thus there is no danger of the brakes becoming "tied up" and cause an accident. When the vehicle is again stopped, the brakes will, if applied, be held applied in a manner already set forth.

Referring to the modified control arrangement shown in Figure 4, the brake holding valve interposed between conduits 21 and 22 is of slightly modified construction. The fluted stem 28 and valve element 29 instead of being controlled by two rotatable members is controlled by a single rotatable member 47 having a flat surface 48 which permits the valve element to be seated. The external end of the rotatable member carries an arm 49 which is connected by a rod 50 to the diaphragm 51 of a suction motor 52. A spring 53 biases the diaphragm to an inoperative position and also so positions the rotatable member 47 that the valve element 29 will be held off its seat against the action of spring 30. The suction motor is connected to the manifold of the engine by conduits 54 and 55 and interposed therebetween is a control valve 56. This control valve comprises a cylindrical casing 57 having reciprocable therein a valve element 58 of the spool type. An atmospheric port 59 in the casing connects the suction motor to the atmosphere in one position of the valve element 58 to thereby permit the suction motor to be inoperative under certain conditions.

The spool valve element 48 is connected by a rod 60 to a diaphragm 61 of a fluid motor 62. A spring 63 biases diaphragm 61 to an inoperative position and also so positions the valve element 58 that the conduits 54 and 55 will be in communication with each other and the atmospheric port 59 closed. A conduit 64 places the fluid motor in communication with pump 9 driven by the driven shaft of the change speed gearing 7.

In operation when the vehicle is stopped, pump 9 will be inoperative and no fluid pressure will be effective on the diaphragm 61 of the fluid motor 62. Under these conditions the spring 63 so positions the spool valve 58 that the suction motor 52 is in communication with the manifold so that suction will be effective on diaphragm 51 to thereby move it to the right and cause the rotatable member 47 to permit the valve element 29 to be closed by spring 30. The brakes will now, if applied, be held applied since the valve element 29 will prevent return flow of fluid to the master cylinder device 17.

When the vehicle is accelerated by opening the throttle valve 4 preparatory to starting the vehicle, the suction effective on the diaphragm 51 will drop rapidly thus permitting spring 53 to move the rotatable member 47 to the position shown in Figure 4, thereby opening the valve element 29 and permitting release of the brakes. As soon as the vehicle begins to move, pump 9 of the change speed transmission will develop pressure which will be effective on the diaphragm 61 of fluid motor 62. The diaphragm will thus be moved against spring 63 and thereby position the spool valve element 58 in the upper end of cylinder 56, thus causing communication between the manifold and the suction motor to be cut off and the suction motor placed in communication with the atmosphere by port 59. The suction motor will now be caused to be inoperative regardless of the closing of the throttle valve. When the vehicle is again brought to a stop, the fluid pressure effective on the diaphragm of the fluid motor 62 will no longer be present, thus permitting spring 63 to move valve 58 to the position shown in Figure 4 and again place the suction motor in communication with the manifold. The valve element 29 will now be permitted to close and the brakes will, if applied, be held applied in a manner already set forth.

In the modified control arrangement shown in Figures 5, 6 and 7, the brake holding valve is the same as that shown in Figure 4. The arm 49, however, instead of being connected to a suction motor is connected by a rod 65 to a plunger 66 of a solenoid 67, a spring 68 normally biasing the rotatable member 47 to a position maintaining the valve element 29 unseated. One end of the wiring of the solenoid is connected by a conductor 69 to a ground and the other end of the wiring is connected by a conductor 70 to a terminal 71 of a suction-operated switch 72. The other terminal 73 of this switch is connected by a conductor 74 to a terminal 75 of a pressure-operated switch 76. The other terminal 77 of switch 76 is connected by a conductor 78 to one terminal of a battery 79, the other terminal of the battery being grounded as shown. The conductor 78 is provided with a switch S which preferably is the ignition switch of the vehicle.

The suction-operated switch 72 is connected to be operated by the suction in the manifold 2. This switch, as shown in Figure 7, comprises a diaphragm 80 which carries a conductor element 81 for electrically connecting the terminals 71 and 73 when suction is effective on the diaphragm to move it to the left. A spring 82 maintains the element 81 in an inoperative position when the suction effect is decreased by opening the throttle valve 4.

As shown in Figure 6, the fluid pressure operated switch comprises a diaphragm 83 for controlling a conductor element 84 for connecting the terminals 75 and 77. A spring 86 normally maintains the conductor element in contact with the terminals. The switch is adapted to be operated by the fluid pressure in passage 85 created by pump 9 of the transmission 7.

In operation when the vehicle is stopped and the engine is idling, the suction-operated switch 72 will be closed. The pressure-operated switch 76 will also be closed since pump 9 is not operating. The electrical circuit will thus be closed and the solenoid 67 energized. This will cause the plunger 66 to move to the right, thereby so positioning member 47 that the valve element 29 will be closed by its spring 30. The brakes, if applied, will now be held applied.

When it is desired to start the vehicle, the engine is accelerated by opening the throttle valve. This will cause such a drop in the suction effective on diaphragm 80 of the suction-operated switch that this switch will be opened by spring 82. The circuit will now be broken and spring 68 associated with plunger 66 of the solenoid will be effective to so move the rotatable member 47 that the valve element 29 will be moved to an open position, thereby releasing the brakes. As soon as the vehicle starts to move the transmission pump 9 will develop pressure and this pressure will open the pressure-operated switch 76 which will remain open as long as the vehicle is moving, thereby insuring that the circuit will be broken. Thus it is seen, that even though the throttle valve 4 should be closed during movement of the vehicle and thereby cause sufficient suction to close the suction-operated switch 72, the solenoid will not be energized. The valve element 29 will thus remain open and permit application and release of the brakes at will. When the vehicle is again brought to a stop, the two switches will again be closed in a manner already indicated, thereby causing the valve element 29 to be closed and permit the brakes, when applied, to be held applied without the necessity of maintaining the operator's foot on the brake pedal.

Being aware of the possibilities of modifications in the particular structures herein described without departing from the fundamental principles of my invention, I do not intend that their scope be limited except as set forth by the appended claims.

Having fully described my invention, what I claim as new and desire to secure by Letters Patent of the United States is:

1. In combination, a vehicle provided with an engine having an intake manifold and an accelerator mechanism causing variation of the suction in said manifold, with a member movable only when the vehicle is moving and with a braking system, means associated with the braking system for holding the brakes applied, control means for said holding means and comprising a suction motor operable by suction in the intake manifold for rendering the holding means operative when the accelerator mechanism is in released position and inoperative when said accelerator mechanism is moved from released position causing a decrease in the suction of the manifold and the suction motor, and means comprising fluid pressure operated means having a pressure developing means operable by the vehicle member for automatically causing the holding means to be inoperative when the vehicle is moving.

2. In combination, a vehicle provided with an engine having an intake manifold and an accelerator mechanism causing variation of the suction in said manifold, with a member movable only when the vehicle is moving and with a braking system, means associated with the braking system for holding the brakes applied, control means for said holding means and comprising a suction motor operable by suction in the intake manifold for rendering the holding means operative when the accelerator mechanism is in released position and inoperative when said accelerator mechanism is moved from released position causing a decrease in the suction of the manifold and the suction motor, a valve for controlling communication between the manifold and the suction motor, and fluid pressure operated means including a pressure developing means operable by the vehicle member for causing said valve to assume a position preventing suction in the manifold from operating the suction motor to cause the holding means to be operative when the vehicle is moving.

3. In combination, a vehicle provided with an intake manifold and an accelerator mechanism causing variation of the suction in the manifold, with a member movable only when the vehicle is moving and with a fluid pressure brake actuating system, a valve associated with the braking system for holding the brakes applied, means comprising a suction motor for controlling the valve, said valve being closed when the accelerator mechanism is in released position and the suction motor is operated by maximum suction in the manifold and open when the accelerator mechanism is moved from released position to speed up the engine and decrease the suction in the manifold, means including a fluid motor for opening said valve, and fluid pressure developing means operable by the vehicle member for causing the fluid motor to hold the valve in an inoperative position when the vehicle is moving.

4. In combination, a vehicle provided with an intake manifold and an accelerator mechanism causing variation of the suction in the manifold, with a member movable only when the vehicle is moving and with a fluid pressure brake actuating system, a valve associated with the braking system for holding the brakes applied, means comprising a suction motor for controlling the valve, said valve being closed when the accelerator mechanism is in released position and the suction motor is operated by maximum suction in the manifold and open when the accelerator mechanism is moved from released position to speed up the engine and decrease the suction in the manifold, a valve for preventing the suction motor from being operated by suction from the manifold, a fluid motor for operating said last named valve, and fluid pressure developing means operable by the vehicle member for causing the fluid motor to place the last named valve in a position to prevent operation of the suction motor when the vehicle is moving.

5. In combination, a vehicle provided with an engine having an intake manifold, an accelerator mechanism causing variation of the suction in the manifold and with a fluid pressure brake actuating system, a valve associated with the braking system for holding the brakes applied, means comprising a solenoid for rendering the valve operative when the solenoid is energized and inoperative when de-energized, an electrical circuit, two switches in said circuit, a suction motor communicating with the manifold, means connecting the suction motor to one switch so that the suction motor will close said switch when the accelerator mechanism is released, and means for holding the other switch open only when the vehicle is moving.

6. In combination, a vehicle provided with an engine having an intake manifold and an accelerator mechanism causing variation of the suction in the manifold, and with a fluid pressure brake actuating system, a valve associated with the braking system for holding the brakes applied, spring means for biasing the valve open, a solenoid for permitting the valve to be closed, an electrical circuit for the solenoid, a suction-controlled switch in the circuit and movable to closed position by suction in the manifold only when the accelerator mechanism is in released position, a second switch in the circuit, and means for maintaining said second switch open only when the vehicle is moving.

7. In combination, a vehicle provided with an engine having an intake manifold and an accelerator mechanism causing variation of the suction in the manifold, and with a fluid pressure brake actuating system, a valve associated with the braking system for holding the brakes applied, spring means for biasing the valve open, a solenoid for permitting the valve to be closed, an electrical circuit for the solenoid, a suction-controlled switch in the circuit and movable to closed position by suction in the manifold only when the accelerator mechanism is in released position, a normally closed second switch in the circuit, a fluid motor for moving said second switch to open position, and fluid pressure developing means connected to be operable only when the vehicle is moving for operating the fluid motor.

8. In combination, a vehicle provided with an engine having an intake manifold and an accelerator mechanism causing variation of the suction in said manifold, with a member movable only when the vehicle is moving and with a braking system, means associated with the braking system for holding the brakes applied, means comprising a suction motor operable by suction in the intake manifold for rendering said holding means operative when the accelerator mechanism is in released position and inoperative when the said accelerator mechanism is moved from released position and causes a decrease in the suction in the manifold, a valve for controlling the suction motor, and means controlled by the vehicle member when moving for rendering said last named valve closed to thus prevent suction in the manifold from operating the suction motor.

9. In combination, a vehicle provided with a propelling engine, with a torque transmitting connection between the engine and the wheels and with a fluid pressure braking system including a source of pressure and a fluid motor connected thereto, valve means associated with the braking system for maintaining fluid under pressure in the fluid motor after the brakes have been applied by the application of pressure from said source, means comprising control means for governing the operativeness and inoperativeness of said valve means, and control means for automatically causing the valve means to be inoperative when the vehicle is moving, said last named control means comprising a fluid pressure operated means and means for controlling said fluid pressure operated means by an element of the torque transmitting connection which moves only when the vehicle is moving.

10. In combination, a vehicle provided with a propelling engine, with a torque transmitting connection between the engine and the wheels and with a fluid pressure braking system including a source of pressure and a fluid motor connected thereto, valve means associated with the braking system for maintaining fluid under pressure in the fluid motor after the brakes have been applied by the application of pressure from said source, a control member for the vehicle, means for controlling said valve means by the control member, said valve means being operative when the control member is not being operated and inoperative when the control member is being operated, and control means for automatically causing the valve means to be inoperative when the vehicle is moving, said last named control means comprising a fluid pressure operated means and means for controlling said fluid pressure operated means by an element of the torque transmitting connection which moves only when the vehicle is moving.

11. In combination, a vehicle provided with a propelling engine, with a torque transmitting connection between the engine and the wheels and with a fluid pressure braking system including a source of pressure and a fluid motor connected thereto, valve means associated with the braking system for maintaining fluid under pressure in the fluid motor after the brakes have been applied by the application of pressure from said source, an accelerator mechanism for the engine, means controlled by said accelerator mechanism when it assumes a released position for enabling said valve means to be operative and thus maintain fluid pressure in the fluid motor and when it is moved from released position for causing said valve means to be inoperative, and means for causing the valve means to be inoperative when the vehicle is moving, said last named means comprising a fluid pressure operated means and means for controlling said fluid pressure operated means by an element of the torque transmitting connection which moves only when the vehicle is moving.

12. In combination, a vehicle provided with an engine and with a power transmission system between the engine and the vehicle wheels embodying an automatic change speed gearing of the type employing a liquid pump driven by the driven shaft of the gearing and used to control ratio changing, a fluid pressure braking system provided with valve means for holding the brakes applied, control means for governing the operativeness and inoperativeness of said valve means, and control means comprising fluid pressure operated means controlled by fluid under pressure from the gearing pump for automatically causing the valve means to be inoperative.

13. In combination, a vehicle provided with an engine and with a power transmission system between the engine and the vehicle wheels embodying an automatic change speed gearing of the type employing a liquid pump driven by the driven shaft of the gearing and used to control ratio changing, a fluid pressure braking system provided with valve means for holding the brakes applied, an accelerator mechanism, means controlled by the accelerator mechanism when it is in released position for enabling the valve means to be operative and when it is moved from released position for causing said valve means to be inoperative, and control means comprising fluid pressure operated means controlled by fluid under pressure from the gearing pump for automatically causing the valve means to be inoperative only when the vehicle is moving.

14. In combination, a vehicle provided with a propelling engine, with a torque transmitting connection between the engine and the wheels and with a fluid pressure braking system including a source of pressure and a fluid motor connected thereto, valve means associated with the braking system for maintaining fluid under pressure in the fluid motor after the brakes have been applied by the application of pressure from said source, an accelerator mechanism for the engine, means controlled by the accelerator mechanism for rendering said valve means operative when said mechanism is in released position and inoperative when said mechanism is moved from released position, and means for causing the valve means to be inoperative when the vehicle is moving and thereby render said first named means ineffective, said last named means comprising a fluid pressure operated means and means for operating said fluid pressure operated means by an element of the torque transmitting connection which moves only when the vehicle is moving.

WALTER R. FREEMAN.